United States Patent
Zhang (10) Patent No.: US 9,059,767 B2
(45) Date of Patent: Jun. 16, 2015

(54) MICROWAVE TRANSMISSION METHOD, APPARATUS, AND SYSTEM USING CCDP AND XPIC

(75) Inventor: Xuekun Zhang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 454 days.

(21) Appl. No.: 13/591,005

(22) Filed: Aug. 21, 2012

(65) Prior Publication Data

US 2012/0315865 A1 Dec. 13, 2012

Related U.S. Application Data

(63) Continuation of application No. PCT/CN2011/071737, filed on Mar. 11, 2011.

(30) Foreign Application Priority Data

Mar. 12, 2010 (CN) .......................... 2010 1 0123084

(51) Int. Cl.
*H04B 1/04* (2006.01)
*H04B 7/10* (2006.01)
*H04B 1/12* (2006.01)
*H04B 7/06* (2006.01)

(52) U.S. Cl.
CPC .................. *H04B 7/10* (2013.01); *H04B 1/126* (2013.01); *H04B 7/063* (2013.01)

(58) Field of Classification Search
CPC ........ H04B 1/0475; H04B 1/40; H04B 1/109; H04L 27/2332
USPC ............................................... 455/114.2, 295
See application file for complete search history.

(56) References Cited

U.S. PATENT DOCUMENTS

| 4,283,795 A | * | 8/1981 | Steinberger | 455/283 |
| 4,321,705 A | * | 3/1982 | Namiki | 375/232 |
| 4,577,330 A | * | 3/1986 | Kavehrad | 375/235 |
| 4,631,734 A | * | 12/1986 | Foschini | 375/235 |

(Continued)

FOREIGN PATENT DOCUMENTS

| CN | 101018370 A | 8/2007 |
| CN | 101227238 A | 7/2008 |

(Continued)

OTHER PUBLICATIONS

International Search Report dated Jun. 23, 2011 in connection with International Patent Application No. PCT/CN2011/071737.

*Primary Examiner* — Hai V Nguyen (57) ABSTRACT

Embodiments of the present invention disclose a microwave transmission method, apparatus, and system using CCDP and XPIC, and relate to the field of mobile communication technologies. The microwave transmission method includes: sending two channels of service that are corresponding to the same frequency and have different polarization directions, where the two channels of service are paired into one logical group; and when receiving, through a feedback channel, a failure signal sent by another end, closing sending of a channel of service that is indicated by the failure signal. In the embodiments of the present invention, after the failure signal sent by the another end is received, the sending of a channel of the service that is indicated by the failure signal is closed, so that no interference is caused to another channel of service, thus ensuring that another channel of service is received correctly.

15 Claims, 5 Drawing Sheets

(56) References Cited

U.S. PATENT DOCUMENTS

| | | | |
|---|---|---|---|
| 4,723,321 A * | 2/1988 | Saleh | 455/295 |
| 4,857,858 A * | 8/1989 | Tahara | 329/311 |
| 4,992,798 A * | 2/1991 | Nozue et al. | 342/362 |
| 5,327,458 A * | 7/1994 | Yamamoto | 375/230 |
| 5,383,224 A * | 1/1995 | Mizoguchi | 375/346 |
| 5,392,459 A * | 2/1995 | Baba et al. | 455/69 |
| 5,432,522 A * | 7/1995 | Kurokami | 342/361 |
| 5,442,663 A * | 8/1995 | Andersen et al. | 375/229 |
| 5,495,502 A * | 2/1996 | Andersen | 375/235 |
| 5,710,799 A * | 1/1998 | Kobayashi | 375/349 |
| 5,838,740 A * | 11/1998 | Kallman et al. | 375/346 |
| 5,844,950 A * | 12/1998 | Aono et al. | 375/346 |
| 5,901,343 A * | 5/1999 | Lange | 455/63.1 |
| 5,905,574 A * | 5/1999 | Vollbrecht et al. | 356/491 |
| 6,169,912 B1 * | 1/2001 | Zuckerman | 455/570 |
| 6,321,075 B1 * | 11/2001 | Butterfield | 455/313 |
| 6,703,974 B2 * | 3/2004 | White et al. | 342/361 |
| 6,731,704 B1 * | 5/2004 | Kiyanagi | 375/346 |
| 6,738,599 B2 * | 5/2004 | Black et al. | 455/62 |
| 6,847,655 B2 * | 1/2005 | Colombo et al. | 370/474 |
| 6,870,515 B2 * | 3/2005 | Kitchener et al. | 343/853 |
| 7,003,058 B2 * | 2/2006 | Bach et al. | 375/346 |
| 7,016,438 B2 * | 3/2006 | Kurokami | 375/346 |
| 7,130,605 B2 * | 10/2006 | Valtolina et al. | 455/303 |
| 7,333,455 B1 * | 2/2008 | Bolt et al. | 370/334 |
| 7,444,170 B2 * | 10/2008 | Karabinis | 455/562.1 |
| 7,613,260 B2 * | 11/2009 | Eliaz et al. | 375/349 |
| 7,720,136 B2 * | 5/2010 | Friedman et al. | 375/220 |
| 7,796,708 B2 * | 9/2010 | Yehudai | 375/324 |
| 7,925,236 B2 * | 4/2011 | Kawai | 455/295 |
| 8,095,088 B2 * | 1/2012 | Shen et al. | 455/114.3 |
| 8,170,158 B2 * | 5/2012 | Thesling et al. | 375/346 |
| 8,244,287 B2 * | 8/2012 | Tavassoli Hozouri et al. | 455/500 |
| 8,275,071 B2 * | 9/2012 | Shen et al. | 375/316 |
| 8,396,177 B1 * | 3/2013 | Morris | 375/346 |
| 8,615,055 B2 * | 12/2013 | Milotta et al. | 375/324 |
| 8,744,000 B2 * | 6/2014 | Zhao | 375/295 |
| 8,879,997 B2 * | 11/2014 | Barker et al. | 455/63.1 |
| 8,918,069 B2 * | 12/2014 | Shen et al. | 455/114.3 |
| 2002/0061752 A1 * | 5/2002 | Kurokami | 455/447 |
| 2003/0043778 A1 * | 3/2003 | Luschi et al. | 370/349 |
| 2004/0127179 A1 * | 7/2004 | Sasaki | 455/146 |
| 2004/0132414 A1 * | 7/2004 | Sendyk et al. | 455/73 |
| 2005/0053169 A1 * | 3/2005 | Jia et al. | 375/267 |
| 2005/0094598 A1 * | 5/2005 | Medvedev et al. | 370/329 |
| 2005/0265436 A1 * | 12/2005 | Suh et al. | 375/221 |
| 2007/0116162 A1 * | 5/2007 | Eliaz et al. | 375/350 |
| 2007/0237242 A1 * | 10/2007 | Gjertsen | 375/242 |
| 2008/0130726 A1 * | 6/2008 | Sofer et al. | 375/220 |
| 2009/0049361 A1 * | 2/2009 | Koren et al. | 714/755 |
| 2009/0086862 A1 * | 4/2009 | Thesling et al. | 375/346 |
| 2009/0102706 A1 * | 4/2009 | Goldblatt et al. | 342/352 |
| 2009/0143042 A1 | 6/2009 | Kawai | |
| 2009/0268792 A1 * | 10/2009 | Colombo | 375/219 |
| 2011/0274218 A1 * | 11/2011 | Yakuwa | 375/340 |
| 2012/0039372 A1 * | 2/2012 | Milotta et al. | 375/220 |
| 2012/0295561 A1 * | 11/2012 | Shen et al. | 455/114.3 |
| 2013/0251061 A1 * | 9/2013 | Zhao | 375/295 |

FOREIGN PATENT DOCUMENTS

| | | |
|---|---|---|
| CN | 101273567 A | 9/2008 |
| CN | 101425833 A | 5/2009 |
| CN | 101485111 A | 7/2009 |
| CN | 101496308 A | 7/2009 |
| CN | 101800678 A | 8/2010 |

* cited by examiner

MICROWAVE TRANSMISSION METHOD, APPARATUS, AND SYSTEM USING CCDP AND XPIC

CROSS-REFERENCE TO RELATED APPLICATIONS

This application is a continuation of International Application No. PCT/CN2011/071737, filed on Mar. 11, 2011, which claims priority to Chinese Patent Application No. 201010123084.X, filed on Mar. 12, 2010, both of which are hereby incorporated by reference in their entireties.

TECHNICAL FIELD

The present invention relates to the field of mobile communications, and in particular, to a microwave transmission method, apparatus, and system using CCDP (Co-Channel Dual Polarization, co-channel dual polarization) and XPIC (Cross Polarization Interference Cancellation, cross polarization interference cancellation).

BACKGROUND

With development of a communication network, a demand for a service bandwidth increases continuously, while an available frequency resource is limited. The CCDP technology is one of main approaches for increasing transmission capacity under the same frequency resource. At the same frequency, the CCDP technology may use two different polarization directions, that is, a horizontal direction and a vertical direction, for transmitting two different channels of signals simultaneously, which may double spectrum utilization.

Figure 1:
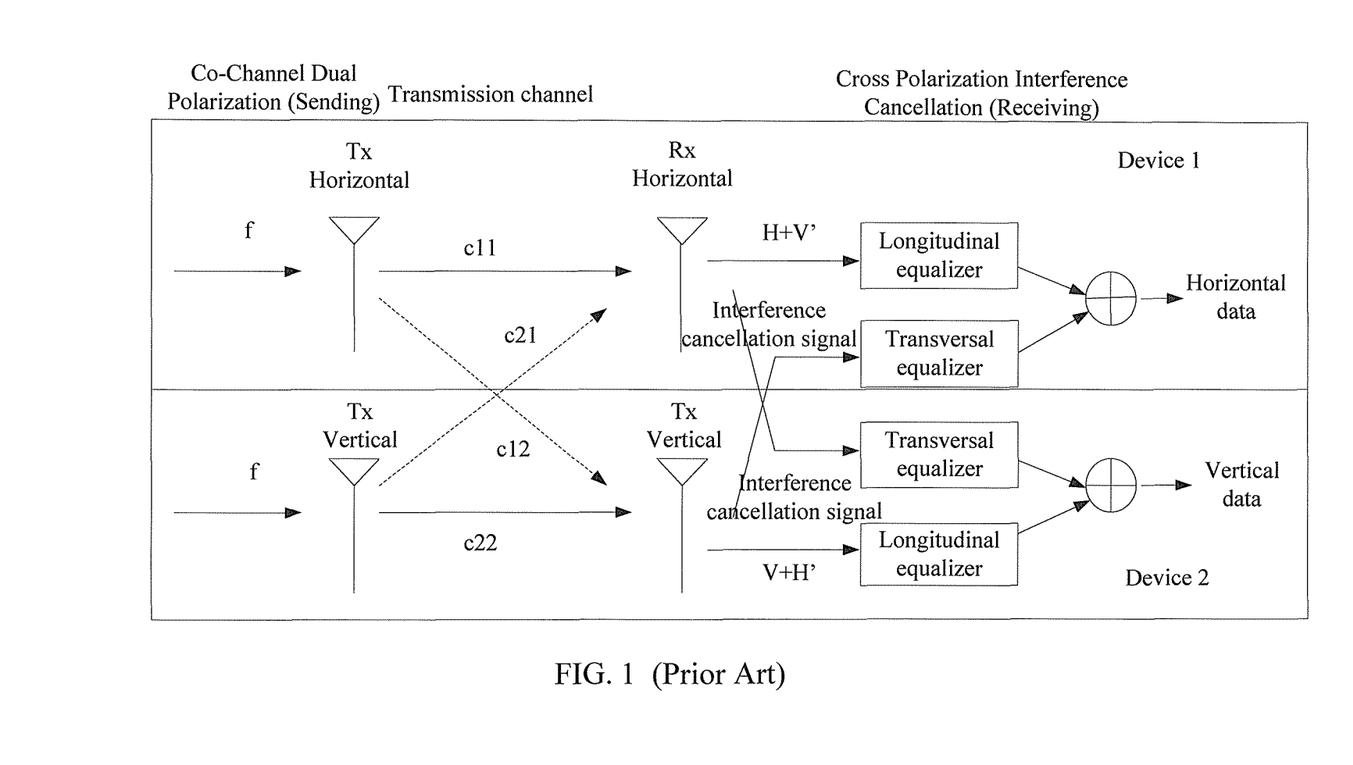
FIG. 1 is a schematic diagram of microwave transmission using CCDP and XPIC in the prior art.

In a CCDP system, because of multipath fading, scattering of an inhomogeneous layer and the ground, an impact of rain and fog, and a limitation of a manufacturing process of a dual-polarized antenna, a cross-polarized signal causes serious interference to a co-polarized signal. In order to correctly receive a signal, the prior art provides a transmission method where CCDP is used for sending and XPIC is used for receiving. At a sending end: two different channels of service are sent by using the same frequency and different polarization directions; in a transmission channel, because of the limitation of the manufacturing process of the dual-polarized antenna and channel depolarization, the service in two different polarization directions interferes with each other; and at a receiving end: interference cancellation signals mutually sent by the service in the two different polarization directions are received, and a transversal filter of a secondary path extracts a copy of an interference signal to cancel out an interference signal in a primary path, so that service in the primary path is correctly received. As shown in FIG. 1, a CCDP transmission model is shown on the left side in the figure, an XPIC reception model is shown on the right side in the figure, and the middle part shows polarization interference that arises in a transmission channel.

A principle of XPIC is described by taking reception of a V signal by the receiving end as an example. A signal sent out by a polarization splitter (a dual-polarized antenna) is a signal (V+H') that is mixed with a horizontal interference component, and a signal split by another polarization splitter is an H signal (H+V') that includes a V signal. The H+V' signal is sent to a transversal filter, a copy of an interference signal of an H signal in the V signal is formed by using a transversal filter, and this copy is subtracted from a received signal V+Ht to cancel interference of the H signal in the signal V+H', so that a pure V signal is obtained.

When implementing the transmission method where CCDP is used for sending and XPIC is used for receiving, the inventor finds that a technical solution of the prior art has at least the following problem: When a board of one channel of service at a receiving end fails, a signal cannot be received and an interference cancellation signal cannot be provided for another channel of service, so that both of the two channels of service in the whole system are unavailable.

SUMMARY

A technical problem that the present invention is intended to solve is to provide a microwave transmission method, apparatus, and system using CCDP and XPIC, which can ensure that when transmission of one channel of service fails, another channel of service can be received normally.

In order to solve the preceding technical problem, embodiments of the present invention adopt the following technical solutions:

A microwave transmission method using co-channel dual polarization and cross polarization interference cancellation includes:

sending two channels of service that are corresponding to the same frequency and have different polarization directions, where the two channels of service are paired into one logical group; and when receiving, through a feedback channel, a failure signal sent by another end, closing sending of a channel of service that is indicated by the failure signal.

A microwave sending apparatus using co-channel dual polarization and cross polarization interference cancellation includes:

a sending unit, configured to send two channels of service that are corresponding to the same frequency and have different polarization directions, where the two channels of service are paired into one logical group;

a receiving unit, configured to receive, through a feedback channel, a failure signal sent by another end; and a closing unit, configured to close sending of a channel of service that is indicated by the failure signal.

A microwave transmission method using co-channel dual polarization and cross polarization interference cancellation includes:

receiving two channels of service that are corresponding to the same frequency and have different polarization directions, where the two channels of service are paired into one logical group; and when a service failure is found, sending a failure signal to another end through a feedback channel, so that the another end closes sending of a channel of service that is indicated by the failure signal.

A microwave receiving apparatus using co-channel dual polarization and cross polarization interference cancellation includes:

a receiving unit, configured to receive two channels of service that are corresponding to the same frequency and have different polarization directions, where the two channels of service are paired into one logical group; and a sending unit, configured to send a failure signal to another end through a feedback channel when a service failure is found, so that the another end closes sending of a channel of service that is indicated by the failure signal.

A microwave transmission system using co-channel dual polarization and cross polarization interference cancellation includes a microwave sending apparatus and a microwave receiving apparatus, where:

the microwave sending apparatus is configured to send two channels of service that are corresponding to the same frequency and have different polarization directions, where the two channels of service are paired into one logical group;

the microwave receiving apparatus is configured to receive the two channels of service sent by the microwave sending apparatus, and when a service failure is found, send, through a feedback channel, a failure signal to the microwave sending apparatus; and after receiving the failure signal, the microwave sending apparatus closes sending of a channel of service that is indicated by the failure signal.

In the technical solution of this embodiment, a receiving end detects board failure states of two channels of service that are sent at the same frequency, and when a service failure is found, a failure signal is sent through a feedback channel, so that a sending end closes sending of a channel of service that is indicated by the failure signal to avoid that this channel of service interferes with normal service, thus ensuring that a channel of service with no failure can be received normally.

Meanwhile, in the embodiments of the present invention, two channels of service are paired into one logical group, so that the whole system may coordinate two channels of service in a horizontal direction and a vertical direction at the sending end and the receiving end, and a working state of a device is adjusted in real time according to conditions of the device and a channel, thus ensuring maximum availability of the system.

BRIEF DESCRIPTION OF THE DRAWINGS

To describe the technical solutions in the embodiments of the present invention or in the prior art more clearly, the accompanying drawings required in the description of the embodiments are briefly introduced in the following. Evidently, the accompanying drawings in the following description are only some embodiments of the present invention, and persons of ordinary skill in the art may also obtain other drawings according to these accompanying drawings without creative efforts.

DETAILED DESCRIPTION

The technical solutions in the embodiments of the present invention are described clearly and completely in the following with reference to the accompanying drawings in the embodiments of the present invention. It is evident that the embodiments to be described are a part rather than all of the embodiments of the present invention. Based on the embodiments of the present invention, all other embodiments that persons of ordinary skill in the art obtain without creative efforts fall within the protection scope of the present invention.

Figure 2:
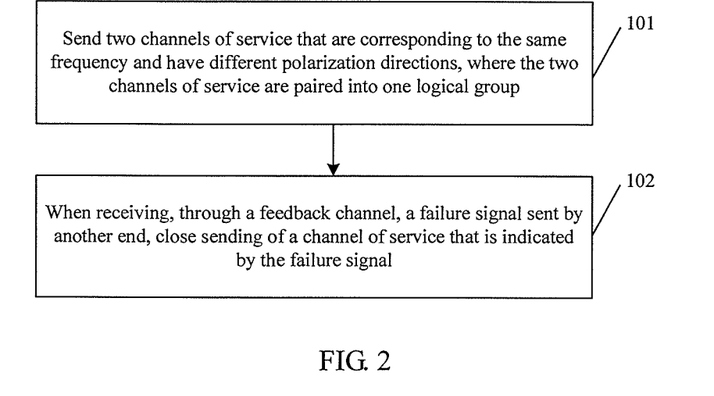
FIG. 2 is a flowchart of a microwave transmission method using CCDP and XPIC according to an embodiment of the present invention.

An embodiment of the present invention provides a microwave transmission method using CCDP and XPIC. As shown in FIG. 2, the method includes:

Step 101: Send two channels of service that are corresponding to the same frequency and have different polarization directions, where the two channels of service are paired into one logical group.

Before two channels of service are sent by using CCDP, firstly two channels of service that use the same frequency in a horizontal direction and in a vertical direction are logically configured into one logical group.

The logical group is configured with a service identifier for identifying the two channels of service, where the service identifier includes:

a logical group number, or a co-channel dual polarization polarization direction, or a co-channel dual polarization transmit frequency, or a co-channel dual polarization transmit power, or a co-channel dual polarization attribute, or a cross polarization interference cancellation attribute.

The service identifier is configured so that a receiving end may identify the two channel of service through the service identifier.

Afterward, the two channels of service of one logical group are sent through a dual polarized antenna in the vertical direction and in the horizontal direction at the same frequency, where each channel of service carries the service identifier for distinguishing the two channels of service.

Step 102: When receiving, through a feedback channel, a failure signal sent by another end, close sending of a channel of service that is indicated by the failure signal.

In this embodiment of the present invention, when receiving the failure signal sent by the another end, the receiving end closes the sending of a channel of the service that is indicated by the failure signal. Because an air interface of a sending end sends no dual polarized signal, a polarized signal does not interfere with service with no failure, and the service with no failure may be received normally. In this case, it is ensured that at least one channel of service in a system is available.

In addition, because CCDP and XPIC are only relevant to a dual polarized antenna, and the dual polarized antenna is a mechanical device and cannot be identified by the system intelligently, the system cannot automatically identify an XPIC group that is paired in a horizontal direction and in a vertical direction. In order to perform maintenance, only such methods as labeling and climbing a tower to perform a check can be used, so that a maintenance cost and difficulty are higher. In this embodiment of the present invention, a logical group is configured to logically determine a pairing relationship between horizontal polarization and vertical polarization, so that the system can identify a channel of service in the logical group specifically is, thus facilitating further real-time control and adjustment on the sent service.

Figure 3:
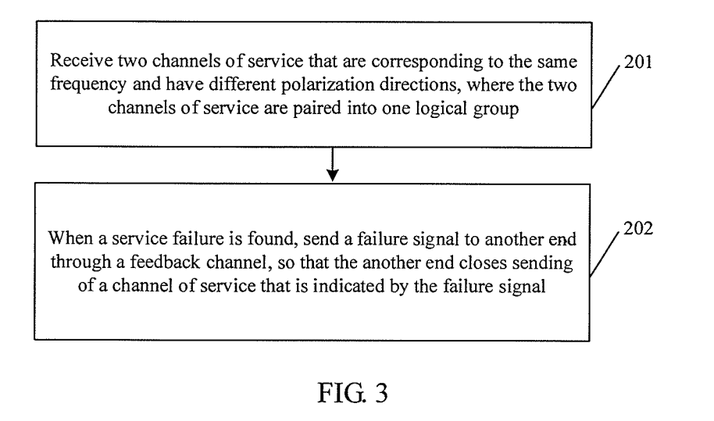
FIG. 3 is a flowchart of a microwave transmission method using CCDP and XPIC according to another embodiment of the present invention.

An embodiment of the present invention further provides a microwave transmission method using CCDP and XPIC. As shown in FIG. 3, the method includes:

Step 201: Receive two channels of service that are corresponding to the same frequency and have different polarization directions, where the two channels of service are paired into one logical group.

Because of a limitation of a manufacturing process of a dual-polarized antenna and channel depolarization, two channels of service that have different polarization directions interfere with each other, so that a receiving end uses the XPIC technology to receive the service sent by a sending end.

The logical group is configured with a service identifier for identifying the two channels of service, where the service identifier includes:

a logical group number, or a co-channel dual polarization polarization direction, or a co-channel dual polarization transmit frequency, or a co-channel dual polarization transmit power, or a co-channel dual polarization attribute, or a cross polarization interference cancellation attribute.

The receiving end distinguishes the two channels of service according to the service identifier.

Step 202: When a service failure is found, send a failure signal to another end through a feedback channel, so that the another end closes sending of a channel of service that is indicated by the failure signal.

At the receiving end, detection is performed on the received two channels of service. The detection includes: a board failure state in the logical group, and states of mutually sent interference cancellation signals and service signals. When the receiving end detects that neither of the two channels of service can be received normally, and one channel of the service sends no interference cancellation signal, and hardware of a board of the channel of service that sends no interference cancellation signal fails, and a board of the other channel of service does not fail, the receiving end sends a failure signal to the another end to indicate that the channel of service that sends no interference cancellation signal needs to be closed.

In the technical solution in this embodiment, the receiving end detects board failure states of the two channels of service that are sent at the same frequency and the states of the mutually sent interference cancellation signals and service signals, and when finding that neither of the two channels of service can be received normally, and one channel of the service sends no interference cancellation signal, and the board of the channel of service that sends no interference cancellation signal fails, and the board of the other channel of service does not fail, the receiving end sends a failure signal of the channel of service that sends no interference cancellation signal to the sending end, and the sending end closes, according to an indication of the failure signal, sending a corresponding channel of service, so as to avoid that this channel of service interferes with normal service, thus ensuring that service with no failure can be received normally.

Meanwhile, in this embodiment of the present invention, two channels of service are paired into one logical group, so that the whole system may coordinate two channels of service in a horizontal direction and a vertical direction at the sending end and the receiving end, and a working state of a device is adjusted in real time according to conditions of the device and a channel, thus ensuring maximum availability of the system.

Figure 4:
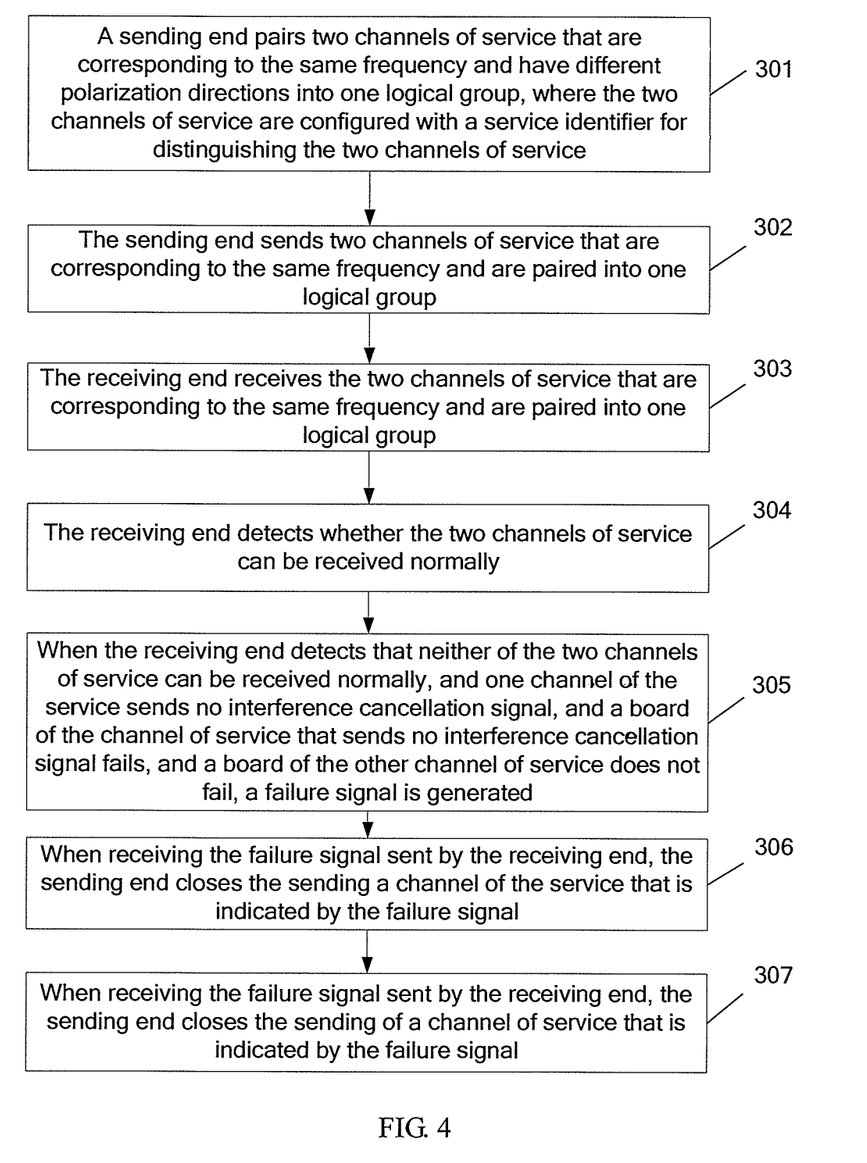
FIG. 4 is a flowchart of a microwave transmission method using CCDP and XPIC according to another embodiment of the present invention.

An embodiment of the present invention further provides a microwave transmission method using CCDP and XPIC. As shown in FIG. 4, the method includes:

Step 301: A sending end pairs two channels of service that are corresponding to the same frequency and have different polarization directions into one logical group, where the two channels of service are configured with a service identifier for distinguishing the two channels of service.

Before two channels of service are sent by using CCDP, firstly two channels of service that use the same frequency in a horizontal direction and in a vertical direction are configured into one logical group, and the two channels of service are respectively configured with a service identifier for distinguishing the two channels of service, so that a receiving end may identify the two channels of service through the service identifier. The service identifier includes: a CCDP polarization direction, a CCDP transmit frequency, a CCDP transmit power, a CCDP attribute, and an XPIC attribute.

By configuring the logical group, the whole system may coordinate two channels of service in a horizontal direction and a vertical direction at the sending end and the receiving end, and a working state of a device is adjusted in real time according to conditions of the device and a channel, thus ensuring maximum availability of the system In the system, when multiple groups of service are transmitted simultaneously, that is, when multiple logical groups need to be configured, logical group numbers used for distinguishing different logical groups further need to be configured for service in these logical groups, so that the receiving end distinguishes, according to an identifier of the logical group, which logical group the received service belongs to. Therefore, the service identifier further includes a logical group number for distinguishing a different logical group.

Step 302: The sending end sends two channels of service that are corresponding to the same frequency and are paired into one logical group.

The two channels of service of one logical group are sent through a dual polarized antenna in the vertical direction and in the horizontal direction respectively, where each channel of service carries a service identifier for distinguishing the two channels of service.

Step 303: The receiving end receives the two channels of service that are corresponding to the same frequency and are paired into one logical group.

The receiving end distinguishes the two channels of service according to the service identifier carried in the service.

Step 304: The receiving end detects whether the two channels of service can be received normally.

At the receiving end, detection is performed on received two channels of service. The detection includes: a board failure state in a logical group, and states of mutually sent interference cancellation signals and service signals.

Step 305: When the receiving end detects that neither of the two channels of service can be received normally, and one channel of the service sends no interference cancellation signal, and a board of the channel of service that sends no interference cancellation signal fails, and a board of the other channel of service does not fail, a failure signal is generated.

Figure 5:
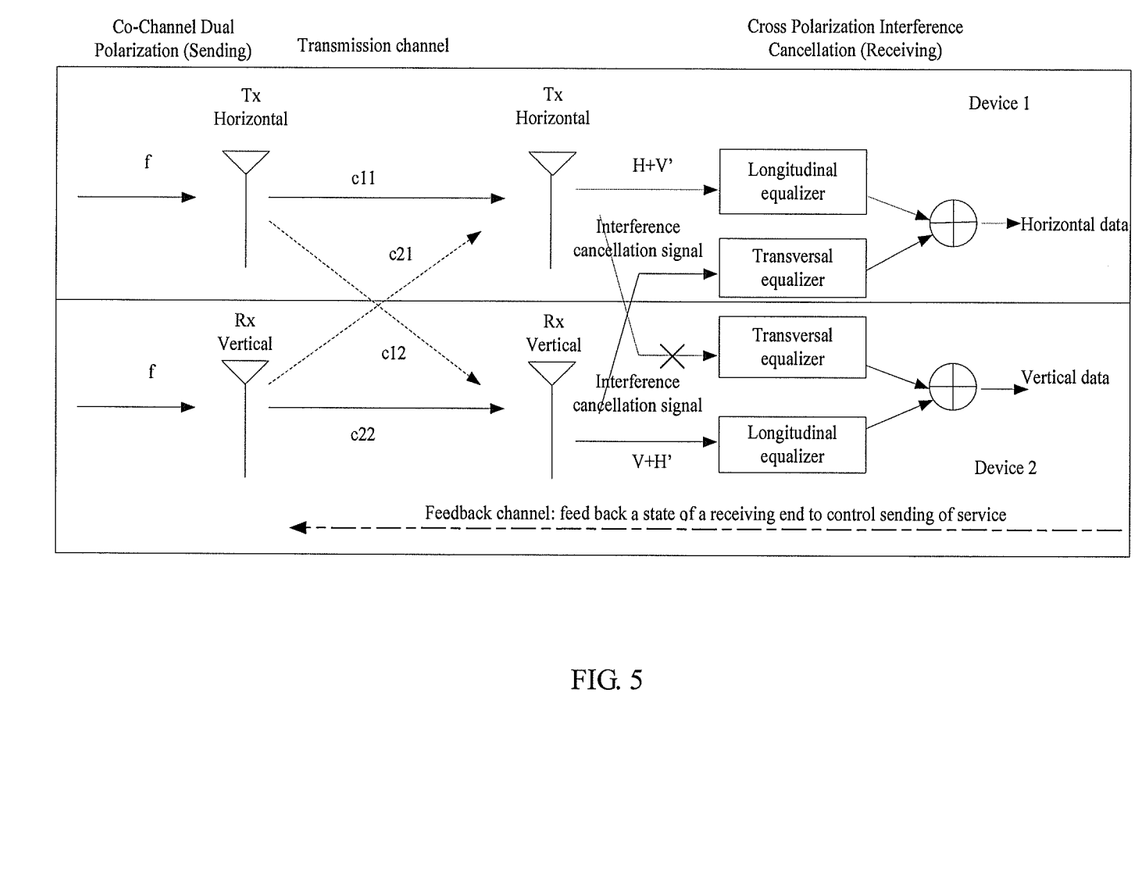
FIG. 5 is a schematic diagram of microwave transmission using CCDP and XPIC according to an embodiment of the present invention.

The receiving end detects board failure states of the two channels of service that are sent at the same frequency and the states of the mutually sent interference cancellation signals and service signals, and when finding that neither of the two channels of service can be received normally, and one channel of the service sends no interference cancellation signal, and the board of the channel of service that sends no interference cancellation signal fails, and the board of the other channel of service does not fail, the receiving end sends a failure signal to the sending end to indicate that the channel of service that sends no interference cancellation signal needs to be closed. As shown in FIG. 5, when it is detected that neither of two channels of service can be received normally, a channel of service that is transmitted by a device 1 sends no interference cancellation signal, and at a receiving end, a board of the device 1 fails, and a board of a device 2 does not fail, because service transmitted by the device 1 interferes with service transmitted by the device 2, the service transmitted by the device 2 cannot be received normally. At this time, a failure signal needs to be generated to indicate that sending of a channel of the channel of service that is transmitted by the device 1 needs to be closed, so as to cancel interference of this channel of service on the service transmitted by the device 2.

Step 306: The receiving end sends the failure signal to instruct the sending end of the service that sends no interference cancellation signal to close the sending.

As shown in FIG. 5, a failure signal is sent through a feedback channel to instruct a sending end of the device 1 to close the sending. A definition of the feedback channel is shown in Table 1.

TABLE 1

| Microwave frame overhead | 1-0 | 2-0 | 3-0 | ... | n-0 |
|---|---|---|---|---|---|
| | 1-20 | 2-20 | 3-20 | ... | n-20 |
| | 1-40 | 2-40 | 3-40 | ... | n-40 |
| | 1-60 | 2-60 | 3-60 | ... | n-60 |
| | 1-64 | 2-64 | 3-64 | ... | n-64 |

The feedback channel may adopt an independent feedback channel, and may also adopt an existing channel between the sending end and the receiving end, where the existing channel is implemented through a fed-back microwave frame. That is, the failure signal may be sent through the fed-back microwave frame.

As shown in Table 2, one bit of information may be added in a microwave frame overhead to respond whether the sending end needs to close the sending.

TABLE 2

| Definition of microwave frame overhead | | 1 bit | |
|---|---|---|---|
| Header | Other overhead information | Sending state | Other overhead information |

When a logical group is configured, it may be defined that: When a sending state received by the sending end is 1, the sending is closed; and when the sending state received by the sending end is 0, the sending is performed normally.

Furthermore, as shown in Table 3, two bits of information may further be added in a microwave frame overhead to clearly respond which channel of service at the sending end needs to be closed, so as to improve reliable transmission of a failure signal that is responded.

TABLE 3

| Definition of microwave frame overhead | | 1 bit | 1 bit | |
|---|---|---|---|---|
| Header | Other overhead information | Sending state of V channel of service | Sending state of H channel of service | Other overhead information |

When a logical group is configured, it may be defined that: 1 bit is used for a sending state of V channel of service at the sending end and 1 bit is used for a sending state of H channel of service at the sending end; when a sending state is 1, the sending is closed; and when the sending state is 0, the sending is performed normally.

Step 307: When receiving the failure signal sent by the receiving end, the sending end closes the sending of a channel of the service that is indicated by the failure signal.

As shown in FIG. 5, because an air interface of the sending end sends no dual polarized signal, a polarized signal does not interfere with service sent by the device 2, and the service sent by the device 2 can be received normally. In this case, it is ensured that at least one channel of service in a system is available.

In the technical solution in this embodiment, the receiving end detects board failure states of the two channels of service that are sent at the same frequency and the states of the mutually sent interference cancellation signals and service signals, and when finding that neither of the two channels of service can be received normally, and one channel of the service sends no interference cancellation signal, and the board of the channel of service that sends no interference cancellation signal fails, and the board of the other channel of service does not fail, the receiving end sends a failure signal of the channel of service that sends no interference cancellation signal to the sending end, and the sending end closes, according to an indication of the failure signal, sending a corresponding channel of service, so as to avoid that this channel of service interferes with normal service, thus ensuring that a channel of service with no failure can be received normally.

Meanwhile, in this embodiment of the present invention, two channels of service are paired into one logical group. When the two channels of service are not paired into a logical group, because CCDP and XPIC are only relevant to a dual polarized antenna, and the dual polarized antenna is a mechanical device and cannot be identified by the system intelligently, the system cannot automatically identify an XPIC group that is paired in a horizontal direction and in a vertical direction. In order to perform maintenance, only such methods as labeling and climbing a tower to perform a check can be used, so that a maintenance cost and difficulty are higher. By configuring a logical group, a pairing relationship between horizontal polarization and vertical polarization is logically determined, so that the whole system may coordinate the two channels of service in the horizontal direction and the vertical direction at the sending end and the receiving end, and a working state of a device is adjusted in real time according to conditions of the device and a channel, thus ensuring maximum availability of the system and reducing the maintenance cost and difficulty.

Figure 6:
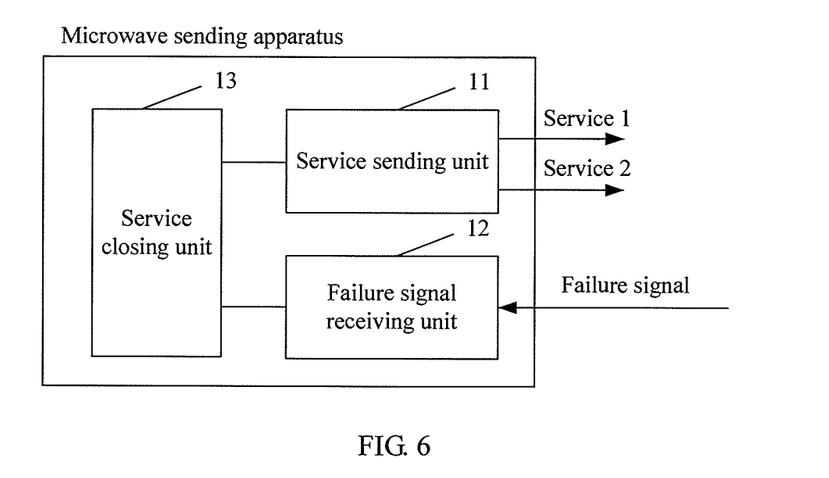
FIG. 6 is a structural block diagram of a microwave sending apparatus using CCDP and XPIC according to another embodiment of the present invention.

An embodiment of the present invention further provides a microwave sending apparatus using CCDP and XPIC. As shown in FIG. 6, the microwave sending apparatus includes: a service sending unit 11, a failure signal receiving unit 12, and a service closing unit 13.

The service sending unit 11 is configured to send two channels of service that are corresponding to the same frequency and have different polarization directions, where the two channels of service are paired into one logical group.

The failure signal receiving unit 12 is configured to receive, through a feedback channel, a failure signal sent by another end.

The service closing unit 13 is configured to close sending of a channel of service that is indicated by the failure signal.

In this embodiment of the present invention, the logical group is configured with a service identifier for identifying the two channels of service, where the service identifier includes:

a logical group number, or a co-channel dual polarization polarization direction, or a co-channel dual polarization transmit frequency, or a co-channel dual polarization transmit power, or a co-channel dual polarization attribute, or a cross polarization interference cancellation attribute.

In this embodiment of the present invention, when receiving the failure signal sent by the another end, the microwave sending apparatus closes the sending of a channel of the service that is indicated by the failure signal. Because an air interface of a sending end sends no dual polarized signal, a polarized signal does not interferes with service with no failure and the service with no failure can be received normally. In this case, it is ensured that at least one channel of service in a system is available.

Because CCDP and XPIC are only relevant to a dual polarized antenna, and the dual polarized antenna is a mechanical device and cannot be identified by the system intelligently, the system cannot automatically identify an XPIC group that is paired in a horizontal direction and in a vertical direction. In order to perform maintenance, only such methods as labeling and climbing a tower to perform a check can be used, so that a maintenance cost and difficulty are higher. In this embodiment of the present invention, by configuring a logical group, a pairing relationship between horizontal polarization and vertical polarization is logically determined, so that the system can identify a channel of service in the logical group specifically is, thus facilitating further real-time control and adjustment on sent service.

Figure 7:
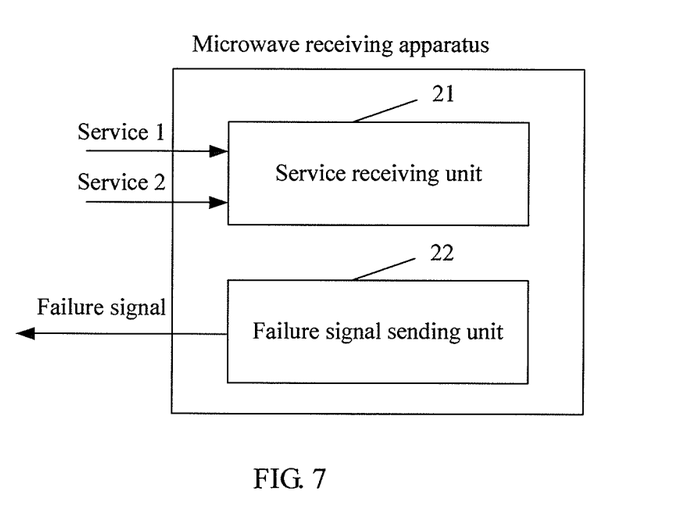
FIG. 7 is a structural block diagram of a microwave receiving apparatus using CCDP and XPIC according to another embodiment of the present invention.

An embodiment of the present invention further provides a microwave receiving apparatus using CCDP and XPIC. As shown in FIG. 7, the microwave receiving apparatus includes: a service receiving unit 21 and a failure signal sending unit 22.

The service receiving unit 21 is configured to receive two channels of service that are corresponding to the same frequency and have different polarization directions, where the two channels of service are paired into one logical group.

The failure signal sending unit 22 is configured to send a failure signal to another end through a feedback channel when a service failure is found, so that the another end closes sending of a channel of service that is indicated by the failure signal.

The logical group is configured with a service identifier for identifying the two channels of service, where the service identifier includes:

a logical group number, or a co-channel dual polarization polarization direction, or a co-channel dual polarization transmit frequency, or a co-channel dual polarization transmit power, or a co-channel dual polarization attribute, or a cross polarization interference cancellation attribute.

In this embodiment of the present invention, the failure signal sending unit sends the failure signal to the another end through the feedback channel when the service failure is found, which includes:

when neither of the two channels of service can be received normally, and one channel of the service sends no interference cancellation signal, and a board of the channel of service that sends no interference cancellation signal fails, and a board of the other channel of service does not fail, sending a failure signal to the another end to indicate that the channel of service that sends no interference cancellation signal needs to be closed.

In the technical solution in this embodiment, the microwave receiving apparatus detects board failure states of two channels of service that are sent at the same frequency and states of mutually sent interference cancellation signals and service signals, and when finding that neither of the two channels of service can be received normally, and one channel of the service sends no interference cancellation signal, and the board of the channel of service that sends no interference cancellation signal fails, and the board of the other channel of service does not fail, the microwave receiving apparatus sends a failure signal of the channel of service that sends no interference cancellation signal to a sending end, and the sending end closes, according to an indication of the failure signal, sending a corresponding channel of service, so as to avoid that this channel of service interferes with normal service, thus ensuring that a channel of service with no failure can be received normally.

Meanwhile, in this embodiment of the present invention, two channels of service are paired into one logical group. When the two channels of service are not paired into a logical group, because CCDP and XPIC are only relevant to a dual polarized antenna, and the dual polarized antenna is a mechanical device and cannot be identified by a system intelligently, the system cannot automatically identify an XPIC group that is paired in a horizontal direction and in a vertical direction. In order to perform maintenance, only such methods as labeling and climbing a tower to perform a check can be used, so that a maintenance cost and difficulty are higher. By configuring a logical group, a pairing relationship between horizontal polarization and vertical polarization is logically determined, so that the whole system may coordinate the two channels of service in the horizontal direction and in the vertical direction at the sending end and the receiving end, and a working state of a device is adjusted in real time according to conditions of the device and a channel, thus ensuring maximum availability of the system and reducing the maintenance cost and difficulty.

Figure 8:
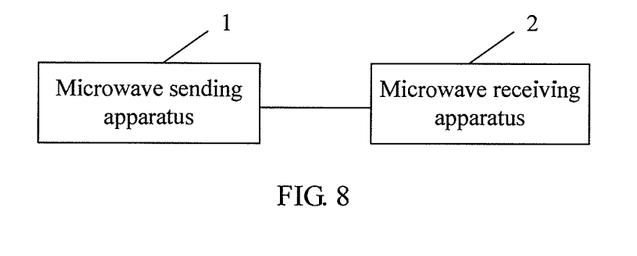
FIG. 8 is a structural block diagram of a microwave system using CCDP and XPIC according to another embodiment of the present invention.

An embodiment of the present invention further provides a microwave transmission system using CCDP and XPIC. As shown in FIG. 8, the system includes: a microwave sending apparatus 1 and a microwave receiving apparatus 2.

The microwave sending apparatus 1 is configured to send two channels of service that are corresponding to the same frequency and have different polarization directions, where the two channels of service are paired into one logical group.

The microwave receiving apparatus 2 is configured to receive the service sent by the microwave sending apparatus 1, and when a service failure is found, send, through a feedback channel, a failure signal to the microwave sending apparatus 1.

After receiving the failure signal, the microwave sending apparatus 1 closes sending of a channel of service that is indicated by the failure signal.

Furthermore, the logical group is configured with a service identifier for identifying the two channels of service, where the service identifier includes:

a logical group number, or a co-channel dual polarization polarization direction, or a co-channel dual polarization transmit frequency, or a co-channel dual polarization transmit power, or a co-channel dual polarization attribute, or a cross polarization interference cancellation attribute.

Furthermore, the microwave receiving apparatus 2 sends, when the service failure is found, the failure signal to the microwave sending apparatus 1 through the feedback channel, which includes:

when neither of the two channels of service can be received normally, and one channel of the service sends no interference cancellation signal, and a board of the channel of service that sends no interference cancellation signal fails, and a board of the other channel of service does not fail, sending a failure signal to the microwave sending apparatus 1 to indicate that the channel of service that sends no interference cancellation signal needs to be closed.

In the technical solution in this embodiment, the microwave receiving apparatus detects board failure states of two channels of service that are sent at the same frequency and states of mutually sent interference cancellation signals and service signals, and when finding that neither of the two channels of service can be received normally, and one channel of the service sends no interference cancellation signal, and the board of the channel of service that sends no interference cancellation signal fails, and the board of the other channel of service does not fail, the microwave receiving apparatus sends a failure signal of the channel of service that sends no interference cancellation signal to a sending end, and the microwave sending apparatus closes, according to an indication of the failure signal, sending a corresponding channel of service, so as to avoid that this channel of service interferes with normal service, thus ensuring that a channel of service with no failure can be received normally.

Meanwhile, in this embodiment of the present invention, two channels of service are paired into one logical group. When the two channels of service are not paired into a logical group, because CCDP and XPIC are only relevant to a dual polarized antenna, and the dual polarized antenna is a mechanical device and cannot be identified by a system intelligently, the system cannot automatically identify an XPIC group that is paired in a horizontal direction and in a vertical direction. In order to perform maintenance, only such methods as labeling and climbing a tower to perform a check can be used, so that a maintenance cost and difficulty are higher. By configuring a logical group, a pairing relationship between horizontal polarization and vertical polarization is logically determined, so that the whole system may coordinate the two channels of service in the horizontal direction and in the vertical direction at the sending end and the receiving end, and a working state of a device is adjusted in real time according to conditions of the device and a channel, thus ensuring maximum availability of the system and reducing the maintenance cost and difficulty.

Through the description of the preceding embodiments, persons skilled in the art may clearly understand that the present invention may be implemented by software plus necessary general hardware, and definitely, may also be implemented by hardware, but in many cases, the former is preferred. Based on such understanding, the technical solutions of the present invention, or a part that contributes to the prior art may be embodied in the form of a software product. The computer software product is stored in a readable storage medium, such as a computer floppy disk, a hard disk, or an optical disk, including several instructions to make a computer device (which may be a personal computer, a server, or a network device) execute the method described in each embodiment of the present invention.

The preceding descriptions are only specific embodiments of the present invention, but are not intended to limit the protection scope of the present invention. Any modification or replacement that is easily thought of by persons skilled in the art within the scope of the technology disclosed in the present invention shall fall within the protection scope of the present invention. Therefore, the protection scope of the present invention should be subject to that of the appended claims.

What is claimed is:

1. A microwave transmission method using Co-Channel Dual Polarization and Cross Polarization Interference Cancellation, the method comprising:
   sending two channels of service that are corresponding to the same frequency and have different polarization directions, wherein the two channels of service are paired into one logical group; and
   when receiving, through a feedback channel, a failure signal sent by another end, closing sending of a channel of service that is indicated by the failure signal.

2. The microwave transmission method according to claim 1, wherein the logical group is configured with a service identifier for identifying the two channels of service, and the service identifier comprises:
   a logical group number, or a co-channel dual polarization polarization direction, or a co-channel dual polarization transmit frequency, or a co-channel dual polarization transmit power, or a co-channel dual polarization attribute, or a cross polarization interference cancellation attribute.

3. A microwave sending apparatus using Co-Channel Dual Polarization and Cross Polarization Interference Cancellation, the apparatus comprising:
   a service sending unit, configured to send two channels of service that are corresponding to the same frequency and have different polarization directions, wherein the two channels of service are paired into one logical group;
   a failure signal receiving unit, configured to receive, through a feedback channel, a failure signal sent by another end; and
   a service closing unit, configured to close sending of a channel of service that is indicated by the failure signal.

4. The microwave sending apparatus according to claim 3, wherein the logical group is configured with a service identifier for identifying the two channels of service, and the service identifier comprises:
   a logical group number, or a co-channel dual polarization polarization direction, or a co-channel dual polarization transmit frequency, or a co-channel dual polarization transmit power, or a co-channel dual polarization attribute, or a cross polarization interference cancellation attribute.

5. A microwave transmission method using Co-Channel Dual Polarization and Cross Polarization Interference Cancellation, the method comprising:
   receiving two channels of service that are corresponding to the same frequency and have different polarization directions, wherein the two channels of service are paired into one logical group; and
   when a service failure is found, sending a failure signal to another end through a feedback channel, so that the another end closes sending of a channel of service that is indicated by the failure signal.

6. The microwave transmission method according to claim 5, wherein the sending the failure signal to the another end through the feedback channel when the service failure is found comprises:
   when neither of the two channels of service can be received normally, and one channel of service sends no interference cancellation signal, and a board of the channel of service that sends no interference cancellation signal fails, and a board of the other channel of service does not fail, sending a failure signal to the another end to indicate that the channel of service that sends no interference cancellation signal needs to be closed.

7. The microwave transmission method according to claim 5, wherein the logical group is configured with a service identifier for identifying the two channels of service, and the service identifier comprises:
   a logical group number, or a co-channel dual polarization polarization direction, or a co-channel dual polarization transmit frequency, or a co-channel dual polarization transmit power, or a co-channel dual polarization attribute, or a cross polarization interference cancellation attribute.

8. The microwave transmission method according to claim 7, wherein the failure signal is sent through a fed-back microwave frame.

9. A microwave receiving apparatus using Co-Channel Dual Polarization and Cross Polarization Interference Cancellation, the apparatus comprising:
- a service receiving unit, configured to receive two channels of service that are corresponding to the same frequency and have different polarization directions, wherein the two channels of service are paired into one logical group; and
- a failure signal sending unit, configured to send a failure signal to another end through a feedback channel when a service failure is found, so that the another end closes sending of a channel of service that is indicated by the failure signal.

10. The microwave receiving apparatus according to claim 9, wherein the failure signal sending unit sends the failure signal to the another end through the feedback channel when the service failure is found, which comprises:
- when neither of the two channels of service can be received normally, and one channel of the service sends no interference cancellation signal, and a board of the channel of service that sends no interference cancellation signal fails, and a board of the other channel of service does not fail, sending a failure signal to the another end to indicate that the channel of service that sends no interference cancellation signal needs to be closed.

11. The microwave receiving apparatus according to claim 10, wherein the logical group is configured with a service identifier for identifying the two channels of service, and the service identifier comprises:
- a logical group number, or a co-channel dual polarization polarization direction, or a co-channel dual polarization transmit frequency, or a co-channel dual polarization transmit power, or a co-channel dual polarization attribute, or a cross polarization interference cancellation attribute.

12. The microwave receiving apparatus according to claim 11, wherein the failure signal is sent through a fed-back microwave frame.

13. A microwave transmission system using Co-Channel Dual Polarization and Cross Polarization Interference Cancellation, the system comprising a microwave sending apparatus and a microwave receiving apparatus, wherein:
- the microwave sending apparatus is configured to send two channels of service that are corresponding to the same frequency and have different polarization directions, wherein the two channels of service are paired into one logical group;
- the microwave receiving apparatus is configured to receive the two channels of service sent by the microwave sending apparatus, and when a service failure is found, send, through a feedback channel, a failure signal to the microwave sending apparatus; and
- after receiving the failure signal, the microwave sending apparatus closes sending of a channel of service that is indicated by the failure signal.

14. The microwave transmission system according to claim 13, wherein the logical group is configured with a service identifier for identifying the two channels of service, and the service identifier comprises:
- a logical group number, or a co-channel dual polarization polarization direction, or a co-channel dual polarization transmit frequency, or a co-channel dual polarization transmit power, or a co-channel dual polarization attribute, or a cross polarization interference cancellation attribute.

15. The microwave transmission system according to claim 13, wherein the microwave receiving apparatus sends, when the service failure is found, the failure signal to the microwave sending apparatus through the feedback channel, which comprises:
- when neither of the two channels of service can be received normally, and one channel of the service sends no interference cancellation signal, and a board of the channel of service that sends no interference cancellation signal fails, and a board of the other channel of service does not fail, sending a failure signal to the microwave sending apparatus to indicate that the channel of service that sends no interference cancellation signal needs to be closed.

* * * * *